US012787942B2

(12) United States Patent
Di Giacomo

(10) Patent No.: US 12,787,942 B2
(45) Date of Patent: Nov. 10, 2026

(54) MOBILE HEDGE TRIMMER

(71) Applicant: GRUPPO DI GIACOMO INNOVATIVE THINGS S.r.l., Mariano Comense (IT)

(72) Inventor: Sebastiano Di Giacomo, Colverde (IT)

(73) Assignee: GRUPPO DI GIACOMO INNOVATIVE THINGS S.r.l., Mariano Comense (IT)

( * ) Notice: Subject to any disclaimer, the term of this patent is extended or adjusted under 35 U.S.C. 154(b) by 461 days.

(21) Appl. No.: 18/277,068

(22) PCT Filed: Feb. 21, 2022

(86) PCT No.: PCT/IB2022/051506
§ 371 (c)(1),
(2) Date: Aug. 12, 2023

(87) PCT Pub. No.: WO2022/175905
PCT Pub. Date: Aug. 25, 2022

(65) Prior Publication Data

US 2024/0122124 A1 Apr. 18, 2024

(30) Foreign Application Priority Data

Feb. 22, 2021 (IT) ........................ 102021000003995

(51) Int. Cl.
*A01G 3/053* (2006.01)
*A01G 3/04* (2006.01)

(52) U.S. Cl.
CPC ...... *A01G 3/053* (2013.01); *A01G 2003/0443* (2013.01)

(58) Field of Classification Search
CPC .................. A01G 3/053; A01G 3/0417; A01G 2003/0443
See application file for complete search history.

(56) References Cited

U.S. PATENT DOCUMENTS 2,926,480 A * 3/1960 Kimball .................... A01G 3/04 56/235
4,174,604 A * 11/1979 Wilson, Sr. .......... A01G 3/0417 56/237
(Continued)

FOREIGN PATENT DOCUMENTS

CN 105557335 A * 5/2016 ........... A01G 3/0426
DE 2840854 A1 4/1980
(Continued)

OTHER PUBLICATIONS

FR294076 (Year: 2010).*
CN20594490 (Year: 2016).*

*Primary Examiner* — Cathleen R Hutchins
(74) *Attorney, Agent, or Firm* — Dickinson Wright PLLC; Andrew D. Dorisio

(57) ABSTRACT

Mobile hedge trimmer apparatus (1000, 2000, 3000) comprising a first portion (100) acting as a mobile base adapted to advance along a path on the ground and comprising a plate (150) and at least two wheels, preferably two pairs of wheels (104*a*, 104*b*), and a second portion (200) comprising a pillar (250) adapted to tilt on two axes (A and B) perpendicular to each other; the pillar (250) comprises a first cutting blade (210) adapted to slide along the pillar (250) and a second cutting blade (220) integral with the pillar (250); a control unit (111) is adapted to adjust the inclination of the pillar (250) on the axes (A and B) and/or the position of the first cutting blade (210) along the pillar (250), the control unit (111) receiving information from sensors which comprise at least one tool for measuring an inclination and at least one movement sensor or advancement detector.

19 Claims, 7 Drawing Sheets

(56) References Cited

U.S. PATENT DOCUMENTS

Figure 1:
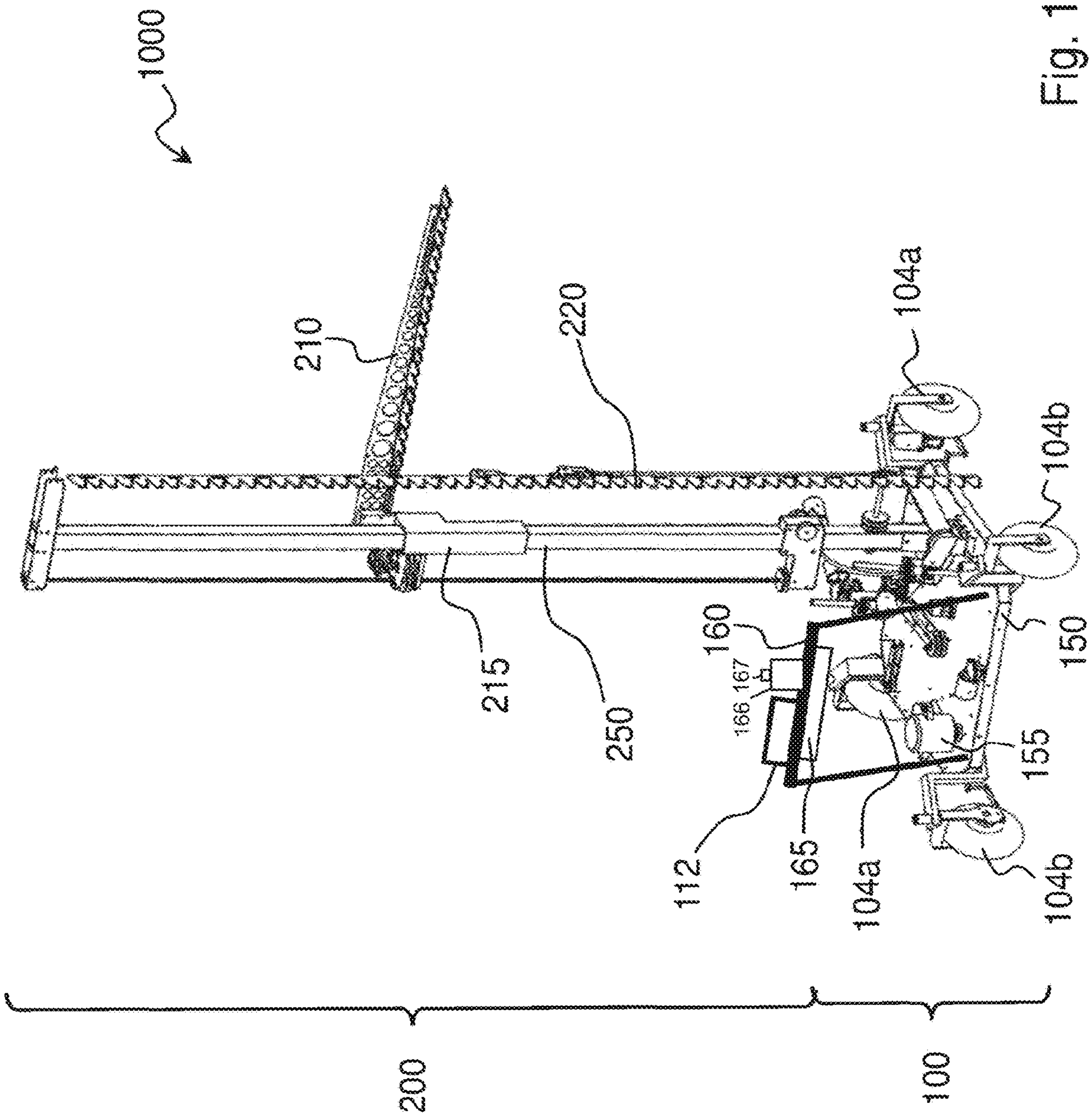

| | | | | | |
|---|---|---|---|---|---|
| 4,577,457 | A * | 3/1986 | Grant | A01G 3/0417 | 56/235 |
| 4,778,022 | A * | 10/1988 | Kamiya | B62D 6/10 | 180/443 |

FOREIGN PATENT DOCUMENTS

| | | | | |
|---|---|---|---|---|
| DE | 3510915 | A * | 10/1986 | A01G 3/0426 |
| EP | 2206425 | A1 | 7/2010 | |
| GB | 2475332 | A | 5/2011 | |
| IT | TV20120172 | A1 | 3/2014 | |

* cited by examiner

MOBILE HEDGE TRIMMER

FIELD OF THE INVENTION

The present invention relates to a mobile hedge trimmer apparatus and a method for adjusting the height of a cutting blade connected to a mobile hedge trimmer apparatus.

BACKGROUND ART

A hedge trimmer is a type of outdoor gardening tool that is used to cut branches and leaves, for example to shape a hedge to a desired, typically geometric, shape.

Various solutions for hedge trimming are known and accessible on the market, both manual and automatic or semi-automatic.

In fact, manual solutions are available, where the cutting work is usually done by a person holding the hedge trimmer, typically with both hands, and moving the cutting blade along the shape of the hedge. The cutting blade is typically elongated in shape and consists of a support rod and two blades, each with a plurality of teeth, driven by a motor to make an alternating cutting motion. Manual hedge trimmers are usually used for trimming and adjusting hedges or bushes, preferably small ones, as it is time-consuming and unsafe in terms of safety, and at the same time it is also difficult to achieve uniform cutting quality requirements.

Alternatively, automatic or semi-automatic solutions are available, in which the cutting blade is mounted on a vehicle, typically a small tractor or carriage, where the user drives the vehicle (motorised or non-motorised). The cutting blade is typically oriented in a vertical and/or horizontal direction with respect to the ground, for lateral and/or upper pruning of plants, respectively, and the cutting blade is fixed or substantially fixed during use with respect to this orientation.

These apparatuses are complicated and costly to produce and operate, maintenance-intensive and relatively complicated to use.

In addition, in the version used for domestic (non-agricultural) pruning, these apparatuses make a cut that is constrained to the direction of the cutting blade. The cutting blade is typically constrained to the vehicle. The direction of the cutting blade, and therefore of the cutting line, is strongly influenced by the shape of the ground on which the vehicle is moving.

Therefore, on uneven or sloping ground, the use of this apparatus may not be suitable for a correct and regular cut of the hedge.

For example, patent document ITTV20120172A1 discloses a mobile hedge cutting machine in which the vertical cutting member is kept in a constant position with respect to a predetermined positional reference, but without taking into account the direction and/or speed of the carriage, and therefore without any possibility of precise cutting of the hedge and without any particular freedom to customise the cut.

Furthermore, patent document EP2206425A1 discloses a device forming a hedge trimmer that can be easily mounted on a commercial motorised machine, such as a micro-tractor or lawn tractor, in which the direction of the cutting blade is adjusted by reference cables positioned along the path, and in which a portion of the hedge trimmer is in contact with the cable during the hedge trimming operation.

SUMMARY

The general aim of the present invention is to overcome the above-mentioned drawbacks related to the known state of the art.

This general object and other more specific objects are reached thanks to what is expressed in the appended claims that form an integral part of the present description.

LIST OF FIGURES

Figure 2:
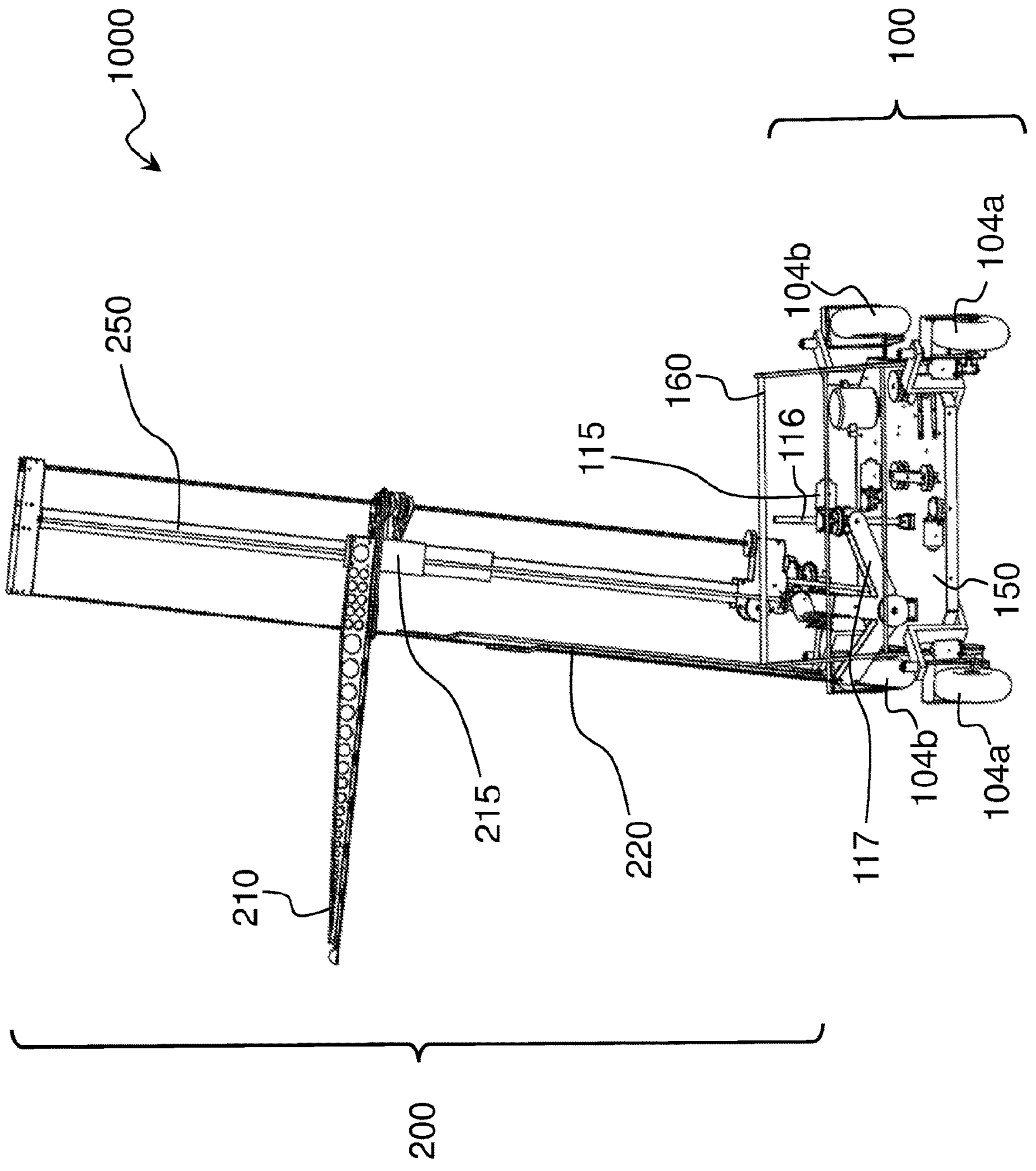
Figure 3:
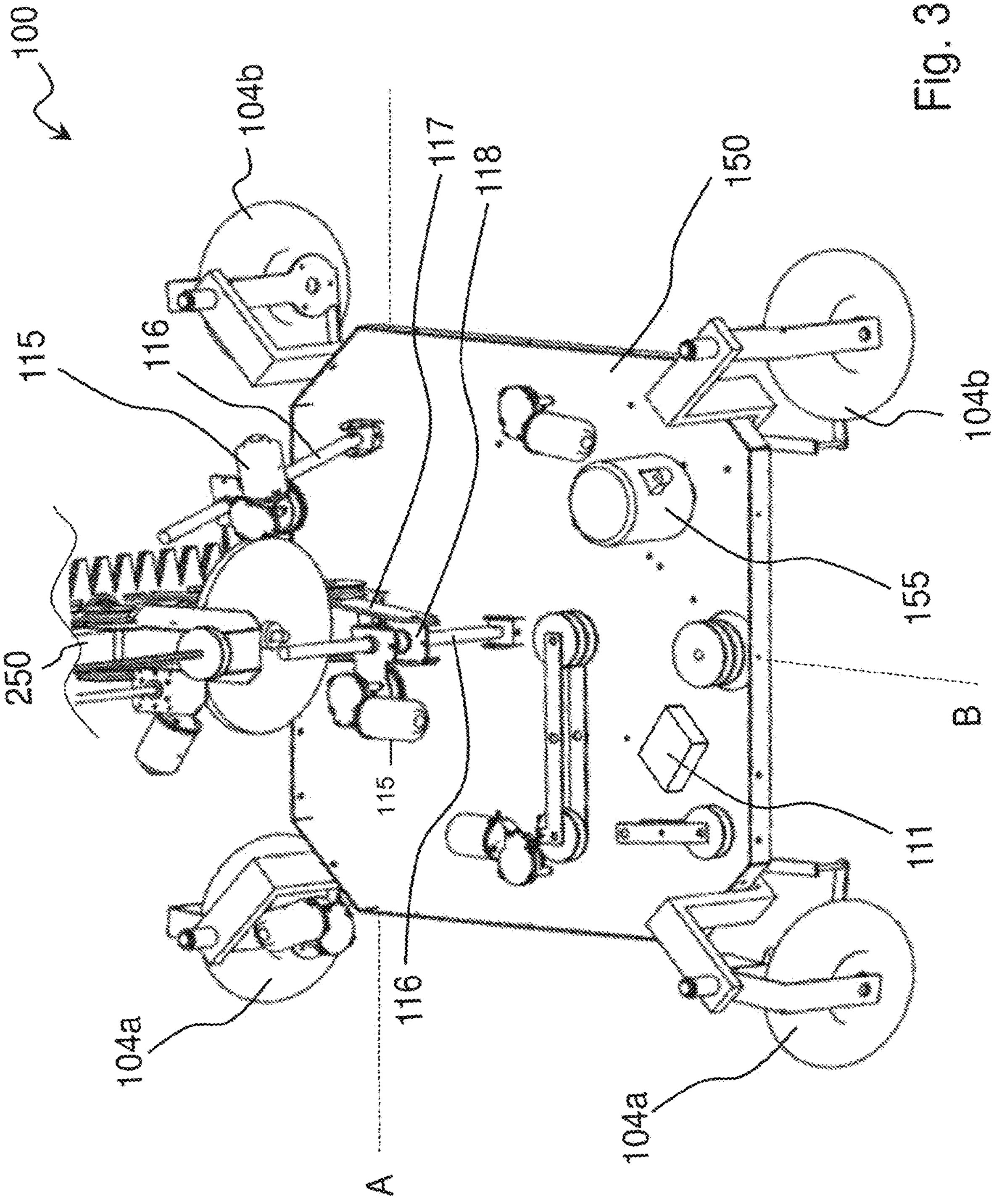
Figure 4:
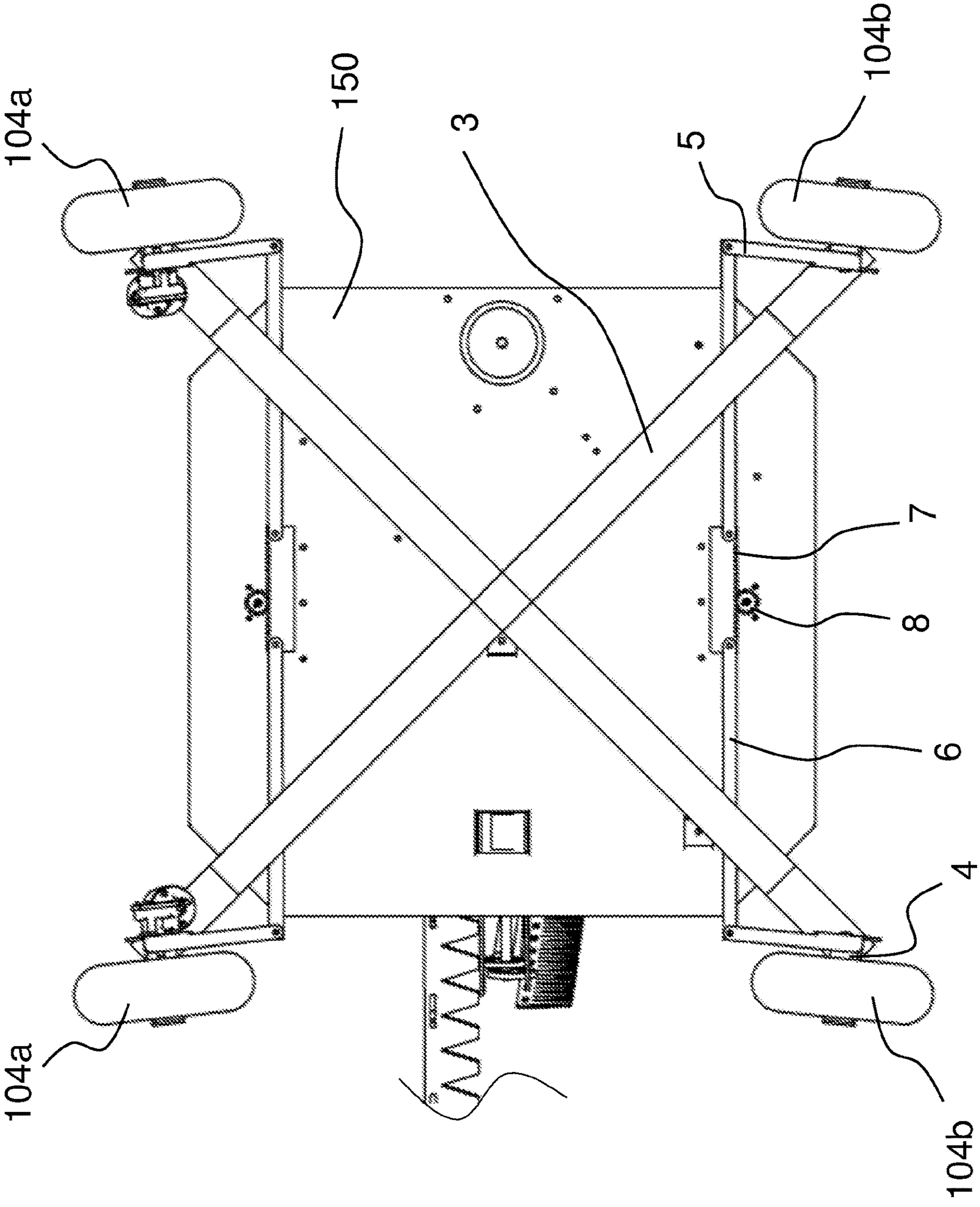
Figure 5A:
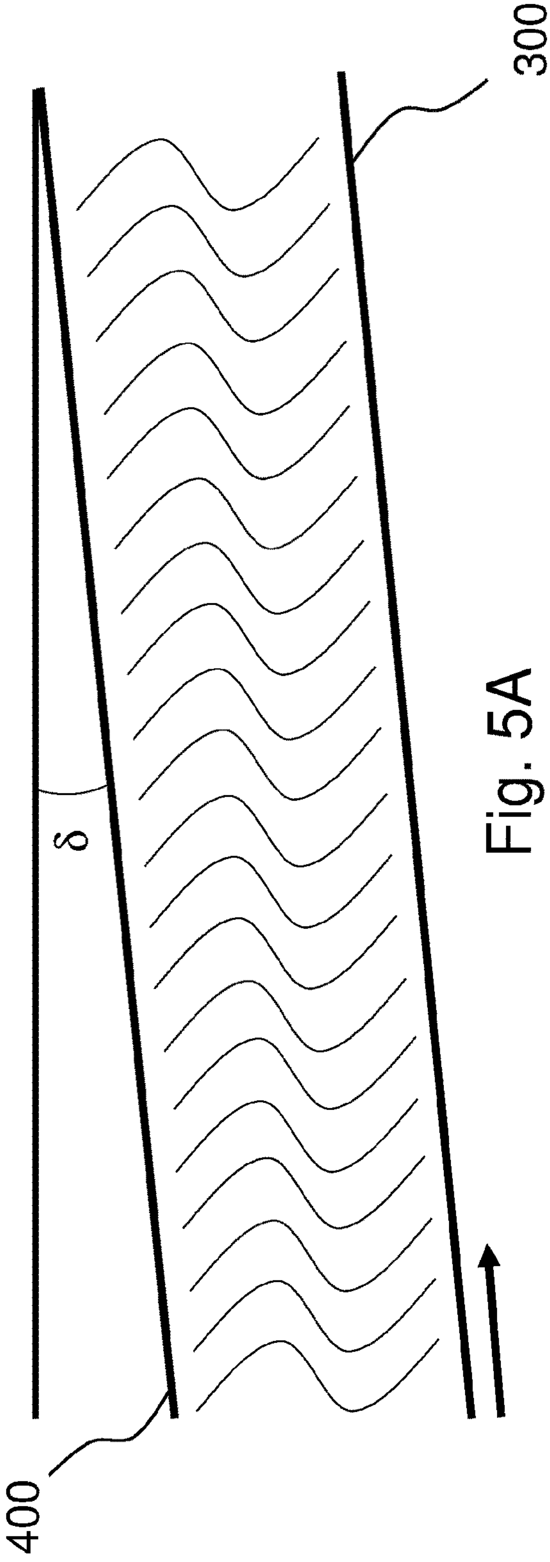
Figure 5B:
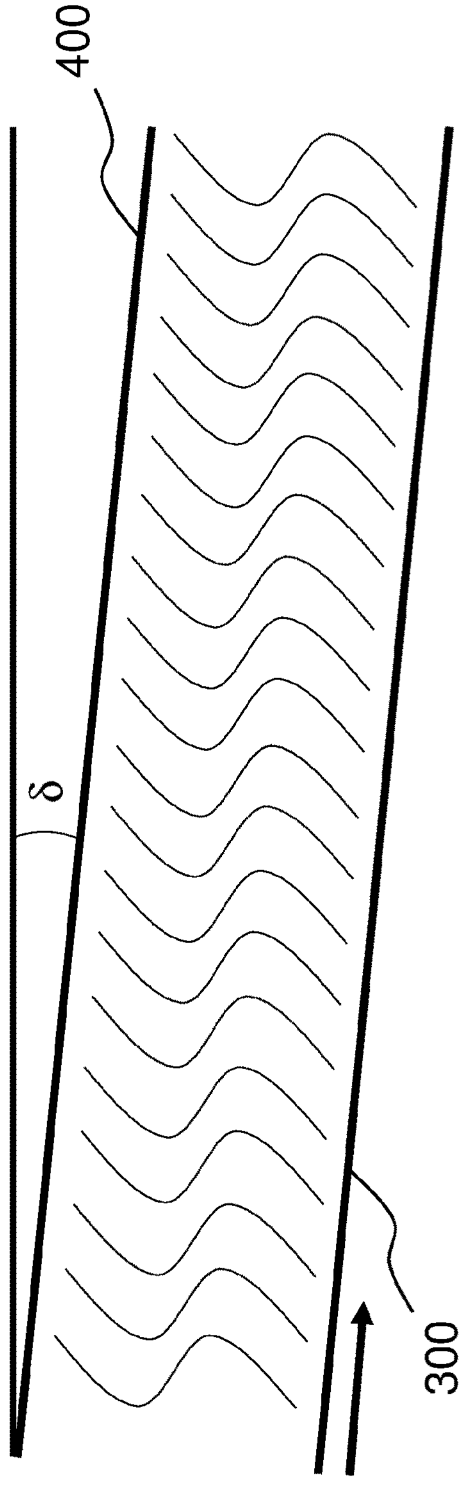
Figure 6A:
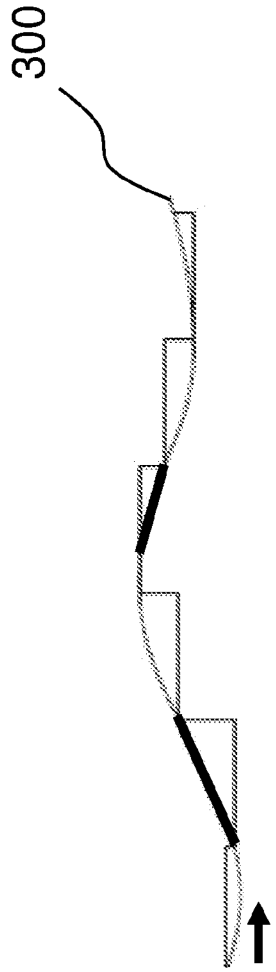
Figure 6B:
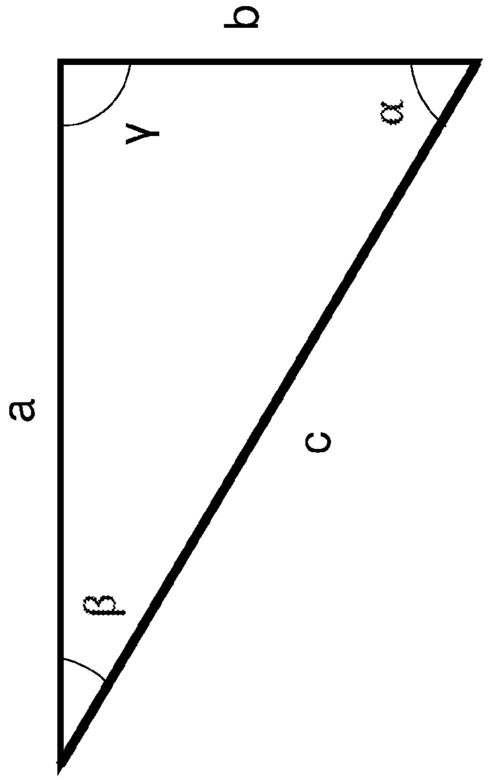
Figure 6C:
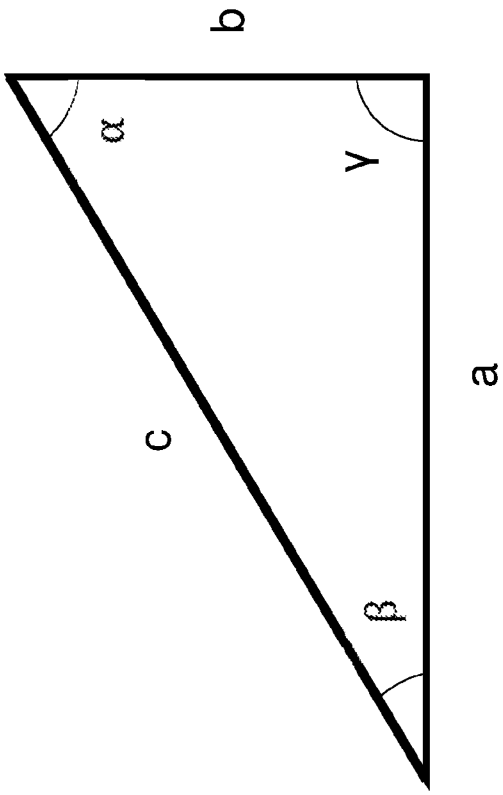
Figure 7B:
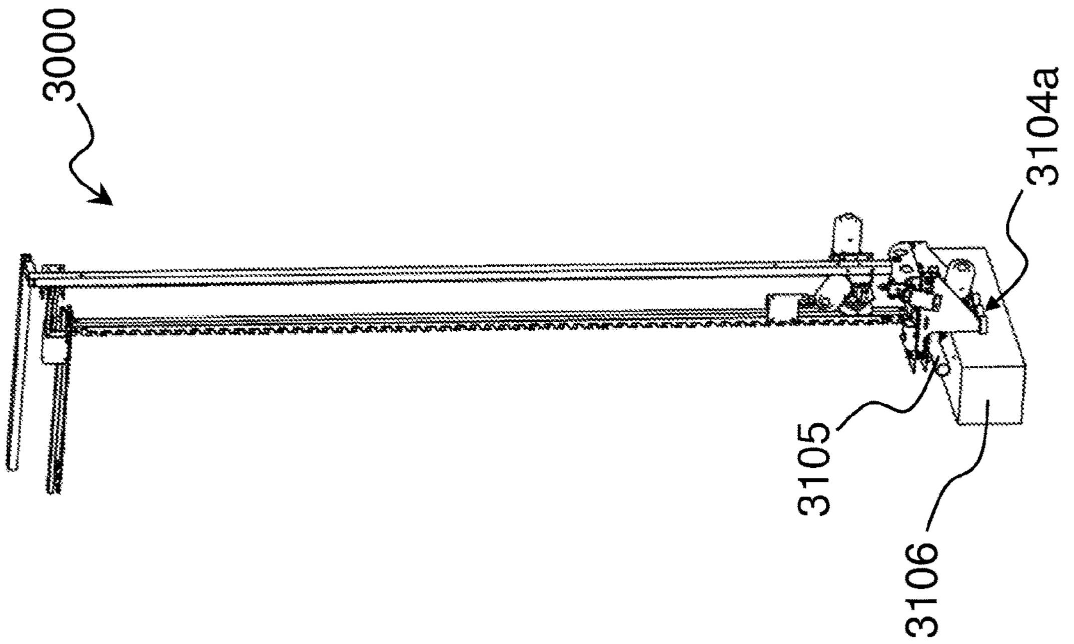
Figure 7A:
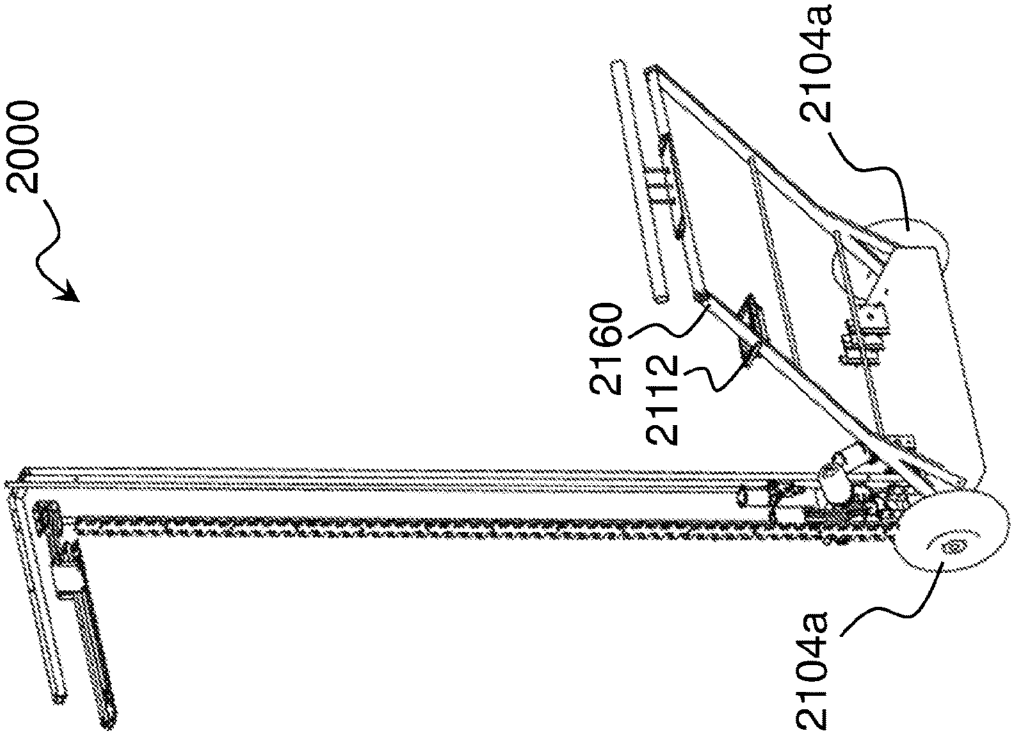

The present invention shall become more readily apparent from the detailed description that follows to be considered together with the accompanying drawings in which:

FIG. 1 shows a first perspective view of an embodiment of a mobile hedge trimmer apparatus according to the present invention, FIG. 2 shows a second perspective view of the embodiment of FIG. 1 rotated with respect to FIG. 1, FIG. 3 shows an enlarged view of the embodiment of FIG. 1, FIG. 4 shows a view from below of a preferred embodiment of the first portion 100, FIG. 5A shows a schematic example of the possibility of cutting a hedge in a simplified situation of uphill ground, FIG. 5B shows a schematic example of the possibility of cutting a hedge in a simplified situation of downhill ground, FIG. 6A shows a schematic example of a section of the ground profile showing advancement ranges of the hedge trimmer apparatus which are useful for calculating the height of the cutting blade, FIG. 6B shows an example of a triangle constructed by means of trigonometric operations on a downhill section of the ground profile, FIG. 6C shows an example of a triangle constructed by trigonometric operations on an uphill section the ground profile, FIG. 7A shows a second embodiment with two wheels of a mobile hedge trimmer apparatus according to the present invention, and FIG. 7B shows a third embodiment of a mobile hedge trimmer apparatus according to the present invention capable of sliding along a rail.

DETAILED DESCRIPTION

For the illustration of the drawings, use is made in the following description of identical or similar numerals to indicate construction elements with the same function. Further, for illustration clarity, some numerical references may not be repeated in all the figures.

Indications such as "vertical" and "horizontal", "upper" and "lower" (in the absence of other indications) are to be read with reference to the assembly (or operating) conditions and with reference to the normal terminology used in everyday language, where "vertical" indicates a substantially parallel direction to that of the gravitational force vector "g" and horizontal to a direction perpendicular thereto, coinciding with the "direction of the horizon".

With general reference to the various figures, a preferred, but not limiting, embodiment of a mobile hedge trimmer apparatus according to the present invention is shown, indicated in its entirety by the numerical reference 1000.

It will be referred to below with the abbreviated notation "apparatus 1000". It has to be noted that in FIG. 7A and in FIG. 7B further embodiments of the mobile hedge trimmer apparatus according to the present invention are shown (these will hereinafter be referred to by the notation "apparatus 2000" and "apparatus 3000"), which differ from apparatus 1000 in particular due to the movement means and the way in which the apparatus moves along a path over a ground (whereby ground is to be understood as the portion on which the apparatus rests, which may be for example the lawn of a garden or the enclosing wall of a property).

The apparatus 1000 constitutes an integrated system which, as will be seen, is capable of automatically adapting its cutting line according to the conformation of the ground on which the apparatus is used. In particular, the apparatus 1000 is able to compensate for any inclination or unevenness of the ground in order to maintain the desired height of the cutting blade, being able to obtain various hedge cutting directions, for example parallel to the horizontal direction or inclined with respect to the horizontal direction (see FIGS. 5A and 5B).

According to a preferred embodiment, the apparatus 1000 substantially comprises two portions 100 and 200 and, as a whole, appears as shown exemplified in FIG. 1 and FIG. 2.

In particular, the first portion 100 acts as a mobile base of the apparatus 1000 adapted to rest on a ground and advancing along a path, and the second portion 200, mechanically connected to the first portion 100, is dedicated to cutting and protrudes from the base of the apparatus 1000. It has to be noted that the path on which the apparatus 1000 advances may be a predefined path, for example marked by detectors or sensors or guides placed in the vicinity of the hedge being cut, or it may be defined by the user by moving the apparatus 1000, as further explained below. It is further to be noted that the apparatus 1000 may rest on a portion of the ground that varies along the path taken due to the advancement thereof; when the apparatus 1000 rests on a portion of the ground, the apparatus 1000, in particular the first portion 100, defines a plane that may be inclined with respect to a horizontal plane, for example in the case where the portion of the ground on which it rests has unevenness and/or depressions.

With reference to the embodiment shown in FIGS. 1-4, the first portion 100 essentially comprises two pairs of wheels, 104*a* and 104*b*, for moving the apparatus 1000 and a plate 150, for example a substantially square shaped plate which, as will become clear later, serves as a support for the second portion 200 and further elements of the apparatus 1000. It has to be noted that according to alternative embodiments, shown for example in FIG. 7A and FIG. 7B, the first portion 100 may comprise a different number of wheels, but generally comprises at least two wheels. It has to be noted that an embodiment comprising three wheels (not shown in the figures) is also easily implemented according to the teachings of the present invention.

According to a preferred embodiment, the apparatus 1000 is motorised, i.e. the wheels are moved by a motor 155.

Alternatively, the apparatus 1000 may be moved by means of mechanical tracks, also moved by a motor 155.

With reference to FIG. 4, the front wheels 104*a* and the rear wheels 104*b* are hinged to a support 4. This support 4 is in turn pivoted to the ends of two uprights 3. Advantageously, the two uprights 3 are positioned on the lower part of the plate 150 so as to form an "X" in which the ends of the uprights 3 are placed at the four corners of the plate 150.

Advantageously, the wheels 104*a* and 104*b* work in pairs: both the front wheels 104*a* and the rear wheels 104*b* are steerable wheels and the wheels 104*a* are also traction wheels.

With reference to FIG. 4, the wheels 104*a* and 104*b* are designed to steer by means of a linkage capable of turning the wheels about the end of the upright 3.

In particular, the supports 4 of the wheels 104*a* and the supports 4 of the wheels 104*b* are pivoted to a first end of a first lever 5. Said lever 5 is pivoted at one end to a second lever 6.

The lever 6 transmitting the steering movement to a first wheel 104*a* and the lever 6 transmitting the steering movement to a second wheel 104*a* are rigidly connected to each other by means of a toothed bar 7.

Similarly, the lever 6 of a first wheel 104*b* and the lever 6 of a second wheel 104*b* are also rigidly connected to each other by means of a toothed bar 7; in particular, one end of the lever 6 of a first wheel 104*b* and one end of the lever 6 of a second wheel 104*b* are connected to the toothed bar 7 so that the toothed bar 7 can rigidly translate by transmitting movement to the respective levers 5 of the wheels 104*a*, 104*b*.

The toothed bar 7 is designed to run on the toothing of a pinion 8 located in the lower part of the plate 150, i.e. the part of the plate facing the ground.

The pinion 8 is rotated by a motor, in particular a servomotor, controlled by a user as explained later.

When the servomotor activates the rotation of the pinion 8, the toothed bar 7 and the respective levers 6 rigidly translate in a horizontal direction in a first sense or in a second sense, causing the respective wheels to be steered in a first sense or in a second sense.

Alternatively, the wheels 104*a* and the wheels 104*b* may be mutually independent steerable wheels, wherein each wheel 104*a* and 104*b* is mechanically connected to a servomotor that specifically controls the steering thereof.

Advantageously and referring to FIG. 1, the first portion 100 further comprises a handlebar 160 adapted to be operated by a user.

In particular, the handlebar 160 comprises a substantially horizontal guide bar pivoted to the first portion 100, in particular to the plate 150, by at least one, advantageously two, support rods.

Advantageously, one or more joysticks 166 including a lever 167 adapted to be operated by a user to define the traction direction and/or the traction speed can be installed on the guide bar.

Alternatively, one or more load cells 165 may be installed on the guide bar adapted to detect at least one force exerted on the handlebar 160, in particular at least one pressure exerted by a user on the guide bar, so that, based on the direction of the force exerted, for example forward or backward, i.e. a force having the sense of the horizontal component directed towards the front wheels 104*a* or towards the rear wheels 104*b*, the traction direction, in particular the traction sense, of the apparatus 1000 is defined.

Further, based on the intensity of the force (pressure) detected by the load cells 165, the traction speed of the apparatus 1000 is defined: a higher pressure corresponds to a higher speed and a lower pressure corresponds to a lower speed; obviously, a zero pressure corresponds to a zero speed.

According to an example embodiment, the advancement of the apparatus 1000 can be defined by a user by moving a joystick, for example a three-axis joystick placed on the handlebar 160.

Advantageously, by using two joysticks, e.g. two dual-axis joysticks on the handlebars 160, the displacement direction of the apparatus 1000 can be further defined.

Typically, the apparatus 1000 may move along a direction parallel to the extension direction of the hedge being cut; in other words, the apparatus 1000 may be side by side with the hedge and move along a path parallel to the extension direction of the hedge. It has to be noted that the extension direction of the hedge can be linear or it can have any non-linear direction, e.g. curved or with direction change angles along the extension of the hedge.

In some cases, it may be advantageous to change the displacement direction of the apparatus 1000 in relation to the extension direction of the hedge, e.g. to avoid obstacles or to move closer to/further away from the hedge to vary the vertical cutting line.

According to an embodiment shown in FIG. 1 and FIG. 2, the handlebar can be translated in a first direction, perpendicular to the extension direction of the hedge and in particular directed towards the hedge, or in a second direction, opposite to the first one, that is directed in the opposite sense to the extension direction of the hedge; basically, translating the handlebar in the first direction causes a movement towards the hedge, and translating the guide bar in the second direction causes a movement away from the hedge.

Alternatively, the displacement direction of the apparatus 1000 may be defined by at least one, preferably two joysticks or load cells 165 placed on the handlebar guide bar 160, in particular by movement of the joystick lever by the user or by different pressure exerted by the user on the load cells 165.

The handlebars 160 and its components are advantageously connected to a control unit 111 which receives electrical or electronic signals as input from them and sends command signals to the servo motor which rotates the pinions 8 of the steering system and to the traction motor connected to the traction wheels of the apparatus 1000.

Advantageously and as will be described below, the first portion 100 further comprises sensors and measuring and/or control devices.

As already mentioned, the second portion 200 is mechanically connected to the first portion 100.

With reference to FIG. 2 and FIG. 3, the second portion 200 comprises a pillar 250 pivoted to the first portion 100 and capable of tilting on two axes A and B perpendicular to each other. Preferably, as shown in the figures, the axis A is parallel to the extension direction of the hedge and the axis B is perpendicular to the extension direction of the hedge.

In particular, the pillar 250 can be inclined or tilted (with respect to a zero reference position, typically coinciding with the vertical direction) using a movement system for each axis A and B.

According to a preferred embodiment shown in FIG. 1-3, the movement system of the pillar 250 comprises a servomotor 115, a worm screw 116, a rod 117 and a slider having a threaded cavity.

In this particular embodiment, the pillar 250 has a square cross-section.

In particular, the rod 117 consists of two levers that are parallel to each other.

A first end of the levers of the rod 117 is constrained to the pillar 250, in particular a first lever is connected to a first side of the pillar 250 and a second lever is connected to a second side of the pillar 250 opposite the first one, so that the levers are parallel and spaced apart from each other by the thickness of the pillar 250.

The slider is connected to the second end of the levers of the 117.

In particular, the slider is positioned between the two levers, e.g. it is pivoted between the two levers.

The slider has a threaded cavity into which the worm screw 116 is inserted.

In particular, the worm screw 116 is adapted to rotate in a clockwise or anticlockwise direction, being moved by the servomotor 115.

The worm screw 116 is adapted to transmit, by means of its rotation, a translational motion to the slider and consequently to the rod 117.

In this way, a translation movement of the rod 117 corresponds to an inclination of the pillar 250.

Alternatively, the threaded slider may act as a nut screw and rotate with respect to the worm screw 116 being placed by the servomotor 115 via a mechanical connection between the slider and the servomotor, for example by means of toothed pinions connected to the levers of the rod 117; during the rotational motion of the slider about the worm screw 116, the slider transmits a translational motion to the worm screw 116.

Alternatively, the movement of the pillar 250 can be implemented with other different movement systems; for example, the rod 117 can be connected and moved by hydraulic pistons, or gear motors can be used, directly connected to the pillar 250 pillar.

Advantageously, a first movement system is adapted to tilt the pillar in direction A and a second movement system is adapted to tilt the pillar in direction or B.

In particular, the servomotors 115 (more generally, the pillar movement system of the pillar 250) are controlled by a control unit 111 (see FIG. 3) operating by means of dedicated software which, as will be further explained below, is adapted to receive information from sensors of the apparatus 1000 and consequently adjust the position of one or more cutting blades of the apparatus 1000.

With reference to FIG. 1 and FIG. 2, at least one cutting blade is constrained to the pillar 250, in particular a first cutting blade 210, perpendicular to the direction of the axis of the pillar 250, and a second cutting blade 220 parallel to the direction of the axis of the pillar 250.

It has to be noted that a typical hedge trimmer blade is made up of blades with double serrated teeth sliding relative to each other.

Advantageously, the first cutting blade 210 can comprise two or more modules that can slide telescopically relative to each other.

According to a preferred example embodiment, the relative movement between the blades of the first cutting blade 210 and the second cutting blade 220 is operated by a belt drive system integral with at least two connecting rods connected to the first cutting blade 210 and the second cutting blade 220, respectively; alternatively, hydraulic pistons or electric motors may be used.

The first cutting blade 210 is adapted to cut an upper profile of the hedge, while the second cutting blade 220 is adapted to cut a side profile of the hedge.

In particular, the first cutting blade 210 is installed on a runner 215, the runner 215 being adapted to slide along a sliding guide, for example a rail, constrained to the pillar 250.

Advantageously, the first cutting blade 210 is installed on the runner 215 by means of a quick coupling, for example by means of a bayonet coupling, so that it can be easily replaced and/or interchanged with different types of cutting blades.

According to a preferred embodiment, the sliding of the runner 215 is driven by a dedicated servomotor, which is also controlled by the control unit 111, so that the position of the runner 215 along the pillar 250 can vary, in particular according to the inclination of the ground with respect to a horizontal plane (and therefore of the first portion 100) and/or bumps and/or depressions on the ground.

In particular, the control unit 111 receives as input parameters and/or measurements and outputs an activating or deactivating command of the servomotor of the runner 215.

As already mentioned, the control unit 111 receives as input the parameters set by the user via the human-machine interface 112.

The control unit 111 may further receive measurements from inclinometers and/or gyroscopes or any other inclination detecting tool and/or accelerometers and/or barometers and/or motion sensors and/or advancement detectors (e.g. encoders) present on, for example, the first portion 100 or the second portion 200. In particular, motion sensors or advancement detectors may detect a direction and/or speed of travel of the apparatus 1000.

The control unit 111 is adapted to receive information from the sensors repeatedly, in particular periodically: for example, the sensors present on the apparatus 1000 can collect data every 10 ms (milliseconds), i.e. substantially in real time, and the control unit 111 can adjust the inclination of the pillar 250 and/or the position of the first cutting blade 210 along the pillar with a time response comparable to that of data collection, i.e. substantially in real time. Advantageously, the data collection frequency and/or the control frequency can be set by the user. According to an example embodiment, the user may have the option of defining a tolerance of the inclination of the pillar 250 with respect to the vertical direction, for example a tolerance of 1° with respect to the vertical direction. Even more advantageously, the user may have the possibility of defining a range of inclination with respect to the vertical direction in which the servomotor(s) controlling the movement system of the pillar 250 reduce their speed, so as to define a "slowing down zone" of the movement of the pillar 250 in proximity to the vertical direction. In particular, the wider the set range, e.g. 0°-8°, the "softer" the inclination adjustment movement, and the narrower the set range, e.g. 0°-2°, the "nervous" the inclination adjustment movement. Advantageously, the operation of the control unit 111 can also be linked to the advancement speed of the apparatus 1000. For example, depending on the frequency of data collection and/or the tolerances set by the user, the control unit 111 can adjust the advancement speed of the apparatus 1000. In particular, in the event that the adjustment of the inclination of the pillar 250 and/or the position of the first cutting blade 210 along the pillar 250 cannot be correctly carried out, the control unit 111 may decrease—possibly even cancel—the advancement speed of the apparatus until the desired adjustment has been made.

Advantageously, the control unit 111 is further connected to a human-machine interface 112, in particular a display and/or buttons and/or a joystick.

The human-machine interface 112 is located, for example, on the handlebar 160 of the apparatus 1000 (see FIG. 1 and FIG. 7A), so that the user can easily set cutting adjustment parameters of the apparatus 1000, for example the shape of the cut of the desired upper portion of the hedge, which, as explained below, can be, for example, parallel to the horizon line or inclined with respect to the horizon line or with parallel sections and perpendicular sections to the horizon line ("stepped" cutting). According to a preferred embodiment, there are two inclinometers: a first inclinometer placed on the plate 150 and a second inclinometer placed on the pillar 250. Advantageously, there may be a third inclinometer placed on the first cutting blade 210.

According to this preferred embodiment, the inclinometers send to the control unit 111 data on the inclination of the plate 150 (and consequently of the ground) with respect to a horizontal plane and/or on the inclination of the first cutting blade 210 and/or on the inclination of the second cutting blade 220, in a first direction A and in a second direction B.

It has to be noted that an inclination of the second cutting blade 220 is equivalent to an inclination of the pillar 250 of the same magnitude, the second cutting blade 220 being constrained to the pillar 250, in particular in a direction parallel to the axis of the pillar 250.

The control unit 111, when it receives as input values of inclination of the second cutting blade 220 other than zero in direction A and/or in direction B, i.e., when the pillar 250 is inclined with respect to a zero position, outputs a drive command to one or more servomotors 115 that adjust the inclination of the pillar 250 so that the inclination of the second cutting blade 220 returns to zero, i.e., that the pillar 250 returns to the zero position.

In other words, an inclination of zero (null inclination) is equivalent to the condition in which the pillar 250 (and therefore the second cutting blade 220) is in the zero position.

The control unit 111 then controls the servomotors 115 so that the zero position of the pillar 250 is maintained in the face of inclinations on the ground.

At the same time, by processing the data as better described below, the first cutting blade 210 for cutting the upper portion of the hedge is adjusted by the control unit 111 to the desired height, so as to follow, for example, an inclined line having an angle of inclination with respect to the horizon line, the amplitude of which is indicated as "δ" (delta) in FIGS. 5A and 5B is defined by the user.

It has to be noted that in FIGS. 5A and 5B the arrows indicate the directions of advancement of the apparatus 1000 on a ground profile 300. Alternatively, the user could set a cut of the upper portion of the hedge parallel to the horizon line.

It has to be noted that, in FIGS. 5A and 5B the ground profile 300 is represented in a simplified way with a regular line; however, it is unlikely to have such a ground profile but more realistically such a profile will be represented by a broken or curved line characterised by stretches of variable slope.

Once the cutting parameters have been set, the control unit 111, during operation of the machine 1000, outputs a command signal to the motor dedicated to the sliding of the runner 215 so as to adjust the height of the first cutting blade 210 along the pillar 250.

According to a preferred embodiment, the control unit 111, in particular its software, regulates the drive of the motor dedicated to sliding the runner 215 on the basis of trigonometric operations.

With reference to FIG. 6A, when the apparatus 1000 moves along a ground profile 300 according to a direction represented by the arrow in the figure, the advancement of the apparatus 1000 can be imagined (and represented) as many small right-angled triangles whose hypotenuses constitute the ground profile 300.

In FIG. 6A, in particular, two hypotenuses located respectively at a downhill and an uphill section of the ground profile 300 on which the apparatus 1000 advances have been highlighted.

With reference to FIG. 6B, an example of a right-angled triangle is provided, constructed by trigonometric operations on a downhill section of ground profile 300, in which the hypotenuse is denoted by the letter "c".

With reference to FIG. 6C, an example of a right-angled triangle is provided, constructed by trigonometric operations on an uphill section of ground profile 300, in which the hypotenuse is denoted by the letter "c".

A cathetus "a" of the triangles in FIGS. 6B and 6C represents the projection of the advancement range of the apparatus in a direction parallel to the horizon line, the other cathetus "b" of the triangles is the variation of ground level (orthogonal to the horizon line and therefore orthogonal to the cathetus "a") in the detected advancement range, the amplitude of the angle "β", opposite the cathetus "b", is provided by the inclination of the ground 300 detected by the inclinometer placed on the plate 150.

The control unit 111, by means of the software, detects the advancement range of the apparatus 1000 from the pulses sent by the encoder; the detected advancement constitutes the hypotenuse "c" of the imaginary triangle while the inclination detected by the inclinometer constitutes the amplitude of the angle "β". The control unit 111 then processes the information received from the sensors and calculates the length of cathetus "b" opposite angle "β".

Therefore, the length of cathetus "b" will be calculated using the formula:

$$b=(c*\sin \beta)/\sin \gamma$$

Considering furthermore that the amplitude of the angle "γ", opposite the hypotenuse "c", is always 90°, since the angle "γ" represents the right angle between the two directions of the reference system considered, consisting of the horizon line and the vertical direction orthogonal thereto, the sine of the angle "γ" is always equal to 1.

The above formula can therefore be simplified:

$$b=c*\sin \beta$$

The value of cathetus "b" calculated as above therefore constitutes the height variation of the ground in the measured advancement range.

It has to be noted that the value of the cathetus "b" also constitutes the height variation of the first cutting blade 210 necessary to compensate for the height variation of the ground in the measured advancement range with respect to the starting point of the cutting blade 210 or to the position of the first cutting blade 210 resulting from the previous measurement.

Therefore, the control unit 111 will drive the motor that determines the sliding of the runner 215 to which the first cutting blade 210 is constrained in order to compensate for such height variation of the ground: the motor will move the runner 215 by an amount equal to the value of the cathetus "b".

It has to be noted that the value of the cathetus "b" can be a positive value (+) or a negative value (−), where the positive value corresponds to an increase in the height of the first cutting blade 210 above the ground and the negative value corresponds to a decrease in the height of the first cutting blade 210 above the ground.

If the desired cutting line is inclined with respect to the horizon line, a measurement of the change in ground level "b1" calculated using the same criterion as above, but replacing the angle "β" with the angle "δ", will be added to (or deducted from) the value of the cathetus "b":

$$b1=c*\sin \delta$$

The angle "δ" is the angle formed by the intersection of the horizon line with the upper cutting line of the desired hedge 400 (see FIG. 5A and FIG. 5B), where the amplitude of the angle "δ" is set by the user on the human-machine interface 112. It has to be noted that in FIGS. 5A and 5B the upper cutting line of the hedge 400 has been represented parallel to the simplified line representing the ground profile 300, i.e. in the represented case the amplitude of the angle "δ" is equal to the amplitude of the angle "β".

However, the user can still set an angle amplitude value "δ" other than "β".

In this way, the apparatus 1000 is able to compensate for depressions, bumps, disconnections and inclinations, which it encounters when advancing on an uneven ground profile (as schematically represented in FIG. 6A).

From the embodiment described above, additional variants are possible, without departing from the teaching of the present invention.

For example, the apparatus 1000 shown in FIGS. 1 and 2 and the apparatus 2000 shown as an example in FIG. 7A can be moved manually by a user, or pulled/pushed manually, in particular by gripping the handlebars 160 and 2160. Note that the apparatus 2000 shown in FIG. 7A differs in particular from the apparatus 1000 shown in FIG. 1 and FIG. 2 due to the number of wheels used to move the apparatus: according to a person skilled in the art the further elements constituting the apparatus may be modified according to the teachings of the present invention. For example, with reference to FIG. 7A, the balance of the apparatus 2000, which comprises only a pair of wheels **2104*a*, is ensured by the user, who in particular, by gripping the handlebar 2160, acts as a third support point of the apparatus 2000. It has also to be noted that the wheels 2104*a* may be independent from each other: for example, in the case of steering the apparatus 2000, just one of the two wheels 2104*a* may be slowed down and/or braked in order to make a change of direction of the apparatus 2000, in particular to carry out a tight radius bend. Advantageously, this steering mode can be implemented in the case of three-wheel apparatus, where two wheels are steerable and a third wheel is free, i.e. its direction is not controlled. Alternatively, the steering of the apparatus 2000 may be carried out by applying a force to the handlebars 2160** to achieve a twist.

Alternatively, the apparatus can be moved by an automatic guide system, e.g. it can run on a magnetic cable or magnetic track (typically underground), or on a physical guide, e.g. a steel cable, elevated above the ground, or on a track or monorail (see for example FIG. 7B), or it can move freely on wheels using an automatic guide system (GPS, optical system, proximity sensors, laser . . . ).

In some cases, particularly where the apparatus moves along a track or monorail, the wheels of the apparatus may be advantageously coupled or possibly replaced by pulleys or cylinders adapted to run along the track or monorail. In particular, the apparatus could comprise two or three wheels/pulleys/cylinders adapted to run along the rail or monorail and a wheel to run on a supporting rail or monorail; it has to be noted that the supporting rail or monorail could advantageously be replaced by a pre-existing structure in proximity to the hedge to be cut, for example a wall or fence.

With particular reference to FIG. 7B, an embodiment of the apparatus 3000 capable of sliding along a monorail 3105 associated with a wall 3106 is shown (note that in FIG. 7B only a portion of the wall is shown), e.g. an enclosing wall of a property in the immediate vicinity of the hedge to be cut. In particular, the apparatus 3000 may comprise a wheel (not visible in the figure) adapted to run along the monorail 3105 and at least one wheel **3104*a* (the example embodiment shown in FIG. 7B depicts three of them) adapted to run along the wall 3106. Advantageously, the wheel adapted to run along the monorail 3105 and the at least one wheel 3104*a* adapted to run along the wall 3106 are arranged in such a way as to ensure the balance of the apparatus 3000**.

It has to be noted that the apparatus 3000 shown in FIG. 7B differs in particular from apparatus 1000 shown in FIG. 1 and FIG. 2 due to the movement system of the apparatus: according to a person skilled in the art the further elements constituting the apparatus may be modified according to the teachings of the present invention.

According to an alternative embodiment, the handlebar 160 may for example be a steering wheel and be twisted clockwise to steer in a first direction or anti-clockwise to steer in a second direction.

Finally, it is clear that the apparatus as conceived herein is susceptible to many modifications and variations, all falling within the present invention; furthermore, all the details are replaceable by technically equivalent elements. In practice, the materials used, as well as their dimensions, can be of any type according to the technical requirements.

According to another aspect, the object disclosed herein relates to a method of adjusting the height of a cutting blade.

The cutting blade is attached to a hedge trimmer that moves along a path over the ground on which the hedge to be cut is located and is height-adjustable in relation to the ground, in such a way as to vary its height with respect to the ground.

The method comprises the steps of:

A) receiving information about an advancement range of the apparatus from a tool for detecting an advancement placed on board said hedge trimmer apparatus;

B) receiving information about the inclination of the ground from a tool for detecting an inclination placed on board said hedge trimmer apparatus;

C) processing information received by a control unit using a trigonometric law and calculating a height variation of the ground;

D) sending a command signal to a motor moving the cutting blade according to the height calculated at step C;

E) repeating steps A to D for each advancement range along said path on the ground.

In particular, the trigonometric law used by the control unit to process the information is:

$$b=c*\sin\beta$$

Wherein:

b is the calculated height variation of the ground, read on a first cathetus of a right-angled triangle;

c is the detected advancement range of the apparatus, read on the hypotenuse of said right-angled triangle; and β is the detected angle of inclination of the ground, read at the angle opposite said first cathetus of said right-angled triangle.

Once the height variation of the ground has been calculated (step C), the control unit starts/shuts down the cutting blade drive motor or keeps the cutting blade drive motor started/shut down (step D) so that the height of the cutting blade in relation to the ground varies or not.

In particular, in step D, the control unit starts or keeps the cutting blade drive motor running if the difference between the height variation of the ground calculated in two subsequent advancement ranges is greater than a predefined tolerance and switches the cutting blade drive motor off or keeps it off if the difference between the height variation of the ground calculated in two subsequent advancement ranges is zero or less than a predefined tolerance.

For example, the control unit starts or keeps the engine running if the difference between the height variation of the ground calculated in two subsequent advancement ranges is greater than 1 cm in absolute value, while it stops or keeps the engine stopped if the difference between the height variation of the ground calculated in two subsequent advancement ranges is less than 1 cm in absolute value.

Therefore, if the calculated ground height is greater than 1 cm (in absolute value), the motor moves the cutting blade by an amount equal to the change in ground level, i.e. "b".

It has to be noted that the value of the cathetus "b" can be either a positive value (+) or a negative value (−), so that the translation movement of the cutting blade corresponds to an increase in height in relation to the ground if the value of "b" is positive, while it corresponds to a decrease in height in relation to the ground if the value of "b" is negative.

The invention claimed is:

1. A mobile hedge trimmer apparatus comprising:

a first portion, said first portion acting as a mobile base adapted to rest on a ground and advance along a path and comprising a plate and at least two wheels, a second portion, said second portion comprising a pillar adapted to tilt on two axes perpendicular to each other, said pillar comprising a first cutting blade and a second cutting blade, said first cutting blade being adapted to slide along said pillar and said second cutting blade being integral with said pillar, a control unit, and sensors connected to said control unit;

wherein the control unit is adapted to adjust an inclination of said pillar on said axes or the position of said first cutting blade along said pillar, based on information received from said sensors, wherein said sensors comprise at least one tool for measuring an inclination of the ground and/or of said pillar and at least one movement sensor or advancement detector, wherein said control unit is adapted to receive information from said sensors repeatedly and to consequently adjust the inclination of said pillar and/or the position of said first cutting blade along said pillar.

2. The mobile hedge trimmer apparatus according to claim 1, wherein said sensors are comprised in said first portion and are adapted to send information regarding an inclination of said plate on said axes or said pillar on said axes.

3. The mobile hedge trimmer apparatus according to claim 2, wherein said control unit controls the actuation of a servomotor when said control unit receives information regarding inclination, with respect to a zero position, of said pillar on said axes.

4. The mobile hedge trimmer apparatus according to claim 1, wherein said sensors are comprised in said second portion and are adapted to send information regarding an inclination of said pillar on said axes.

5. The mobile hedge trimmer apparatus according to claim 1, wherein said control unit is further adapted to cutting parameters set by an operator from a human-machine interface.

6. The mobile hedge trimmer apparatus according to claim 1, wherein said first portion and said second portion are mechanically connected to each other by at least one movement system.

7. The mobile hedge trimmer apparatus according to claim 6, comprising a first movement system for a first inclination axis of said pillar and a second movement system for a second inclination axis of said pillar.

8. The mobile hedge trimmer apparatus according to claim 6, wherein each of the at least one movement systems comprises a worm screw moved by a servomotor, a slider having a threaded cavity coupled with said worm screw and being adapted to run along said worm screw and a rod connected at a first end to said slider and constrained at a second end with said pillar.

9. The mobile hedge trimmer apparatus according to claim 8, wherein said control unit controls the actuation of said servomotor.

10. The mobile hedge trimmer apparatus according to claim 1, wherein said first cutting blade is constrained to a runner, said runner being adapted to slide along said pillar and being actuated by a motor.

11. The mobile hedge trimmer apparatus according to claim 10, wherein said motor is connected to an advancement detector, said advancement detector sending advancement information to said control unit.

12. The mobile hedge trimmer apparatus according to claim 1, wherein at least a pair of wheels is actuated by a motor.

13. The mobile hedge trimmer apparatus according to claim 1, wherein said first portion further comprises a handlebar adapted to be operated by a user.

14. The mobile hedge trimmer apparatus according to claim 13, wherein said handlebar defines a traction direction or a traction speed or a displacement direction of the apparatus.

15. The mobile hedge trimmer apparatus according to claim 13, wherein said handlebar acts as a support point for the apparatus.

16. The mobile hedge trimmer apparatus according to claim 13, wherein said handlebar comprises one or more load cells, said load cells being adapted to detect at least a force exerted on said handlebar and to send electric or electronic signals to said control unit.

17. The mobile hedge trimmer apparatus according to claim 13, wherein said handlebar comprises one or more joysticks, said one or more joysticks comprising at least a lever adapted to be operated by a user and to send electric or electronic signals to said control unit.

18. The mobile hedge trimmer apparatus according to claim 1, wherein the control unit is adapted to process the information received from said sensors using a trigonometric law and calculate a height variation of the ground.

19. A mobile hedge trimmer apparatus comprising:

a first portion, said first portion acting as a mobile base adapted to rest on a ground and advance along a path and comprising a plate and at least two wheels, a second portion, said second portion comprising a pillar adapted to tilt on two axes perpendicular to each other, said pillar comprising a first cutting blade and a second cutting blade, said first cutting blade being adapted to slide along said pillar and said second cutting blade being integral with said pillar, a control unit, and sensors connected to said control unit;

wherein the control unit is adapted to adjust an inclination of said pillar on said axes and the position of said first cutting blade along said pillar, based on information received from said sensors, wherein said sensors comprise at least one tool for measuring an inclination of the ground and of said pillar and at least one movement sensor or advancement detector, wherein said control unit is adapted to receive information from said sensors repeatedly and to consequently adjust the inclination of said pillar and the position of said first cutting blade along said pillar.

* * * * *